United States Patent
Park et al.

(10) Patent No.: US 7,826,715 B2
(45) Date of Patent: Nov. 2, 2010

(54) METHOD AND APPARATUS FOR REPRODUCING DATA FROM THE RECORDING MEDIUM

(75) Inventors: Sung Wan Park, Suwon-si (KR); Kang Soo Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1275 days.

(21) Appl. No.: 11/334,414

(22) Filed: Jan. 19, 2006

(65) Prior Publication Data

US 2006/0165383 A1  Jul. 27, 2006

Related U.S. Application Data

(60) Provisional application No. 60/645,037, filed on Jan. 21, 2005.

(30) Foreign Application Priority Data

Apr. 22, 2005 (KR) .................. 10-2005-0033486

(51) Int. Cl.
*H04N 7/00* (2006.01)
(52) U.S. Cl. .................. 386/95; 386/46; 386/83; 386/109
(58) Field of Classification Search .......... 386/46, 386/95, 83, 109
See application file for complete search history.

(56) References Cited

U.S. PATENT DOCUMENTS

| | | | |
|---|---|---|---|
| 7,542,659 B2 * | 6/2009 | Kozuka et al. | 386/95 |
| 2002/0053036 A1 * | 5/2002 | Kubota | 713/300 |
| 2002/0088011 A1 * | 7/2002 | Lamkin et al. | 725/142 |
| 2002/0141582 A1 * | 10/2002 | Kocher et al. | 380/201 |
| 2003/0081943 A1 * | 5/2003 | Kim et al. | 386/125 |
| 2003/0217279 A1 | 11/2003 | Fuchigami et al. | |
| 2003/0231861 A1 * | 12/2003 | Yoo et al. | 386/46 |

FOREIGN PATENT DOCUMENTS

| | | |
|---|---|---|
| CN | 1416126 | 5/2003 |
| JP | 2000 260027 A | 9/2000 |
| WO | WO 2003/061282 | 7/2003 |

OTHER PUBLICATIONS

Office Action for Chinese patent application No. 200610006924.8 dated Jun. 5, 2009.

* cited by examiner

*Primary Examiner*—Thai Tran
*Assistant Examiner*—Girumsew Wendmagegn
(74) *Attorney, Agent, or Firm*—Harness, Dickey & Pierce

(57) ABSTRACT

A method for downloading data associated with a recording medium from an external source, and reproducing data recorded in the recording medium is disclosed. A method for reproducing data from a recording medium in a player equipped with a network device (i.e., a Network Equipped Player) includes the steps of: a) if the recording medium is loaded, transmitting network configuration information and identification (ID) information of the loaded recording medium to a content provider (CP); b) downloading data associated with the recording medium from the content provider (CP) over a network; and c) reproducing data transmitted over the network and data recorded in the recording medium.

10 Claims, 9 Drawing Sheets

Player

| Player status<br>Disc type | Network<br>Equipped Player | No Network<br>Equipped Player |
|---|---|---|
| A Type | OK(all play) | OK(all play) |
| B Type | OK(Play according to network access status) | Limited play |

FIG. 4

Syntax

```
If (Network Equipped Player) {
            If (Network Connection == OK){
                        do streaming and play;
            } else {
                        check the network line;
                                    do disc media play(only);
                                    or
                                    do streaming and play;
            }
} else {
do disc media play(only);
}
```

FIG. 6A

| PSR number | Name | Meaning |
|---|---|---|
| 0 | Interactive Graphics | Interactive Graphics Stream Number |
| 1 | Audio | Interactive Graphics Stream Number |
| 2 | Presentation graphics and Text subtitle | Presentatin graphics and Text subtitle stream number |
| 3 | Angle | Angle Number |
| 4 | Title | Title Number |
| 5 | Chapter | Chapter Number |
| 6 | PlayList | PlayList id |
| 7 | PlayItem | PlayItem id |
| 8 | Presentation Time | Presentation Time in 45kHz |
| 9 | Timer | Navigation Timer |
| 10 | Selected Button | Button id in Selected State |
| 11 | Menu Page | Page id |
| 12 | Selected Style | User Style id |
| 13 | Parental | Interactive Graphics Stream Number |
| 14 | – | reserved |
| 15 | Audio Configuration | Player configuration for Audio |
| 16 | Audio Language | Language Code for Audio |
| 17 | Presentation Graphics and Text subtitle Language | Language Code for Presentation Graphics and Text subtitle |
| 18 | Menu Language | Language Code for Menu Description |
| 19 | – | reserved |
| : | : | : |
| 29 | – | reserved |
| 30 | Text Capability | Player Capability for Text subtitle |
| 31 | Player Version | Player Version |
| 32 | Network Configuration & Streaming Media Playability | Network Configuration & Player Capability for Streaming Media |
| : | : | : |

FIG. 6B

PSR32

| b31 | b30 | b29 | b28 | b27 | b26 | b25 | b24 |
|---|---|---|---|---|---|---|---|
| Streaming Media Playability(b31-b24) | | | | | | | |

| b23 | b22 | b21 | b20 | b19 | b18 | b17 | b16 |
|---|---|---|---|---|---|---|---|
| Streaming Media Playability(b23-b16) | | | | | | | |

| b15 | b14 | b13 | b12 | b11 | b10 | b9 | b8 |
|---|---|---|---|---|---|---|---|
| Reserved(b15-b8) | | | | | | | |

| b7 | b6 | b5 | b4 | b3 | b2 | b1 | b0 |
|---|---|---|---|---|---|---|---|
| Reserved(b7-b3) | | | | | | | | b0 : BD-J Profile accommodation or non-accommodation
b1 : Network Equipped presence or absence
b2 : Network Connection Status
b31-b16 : Streaming Media Playability presence or absence
Others : reserved

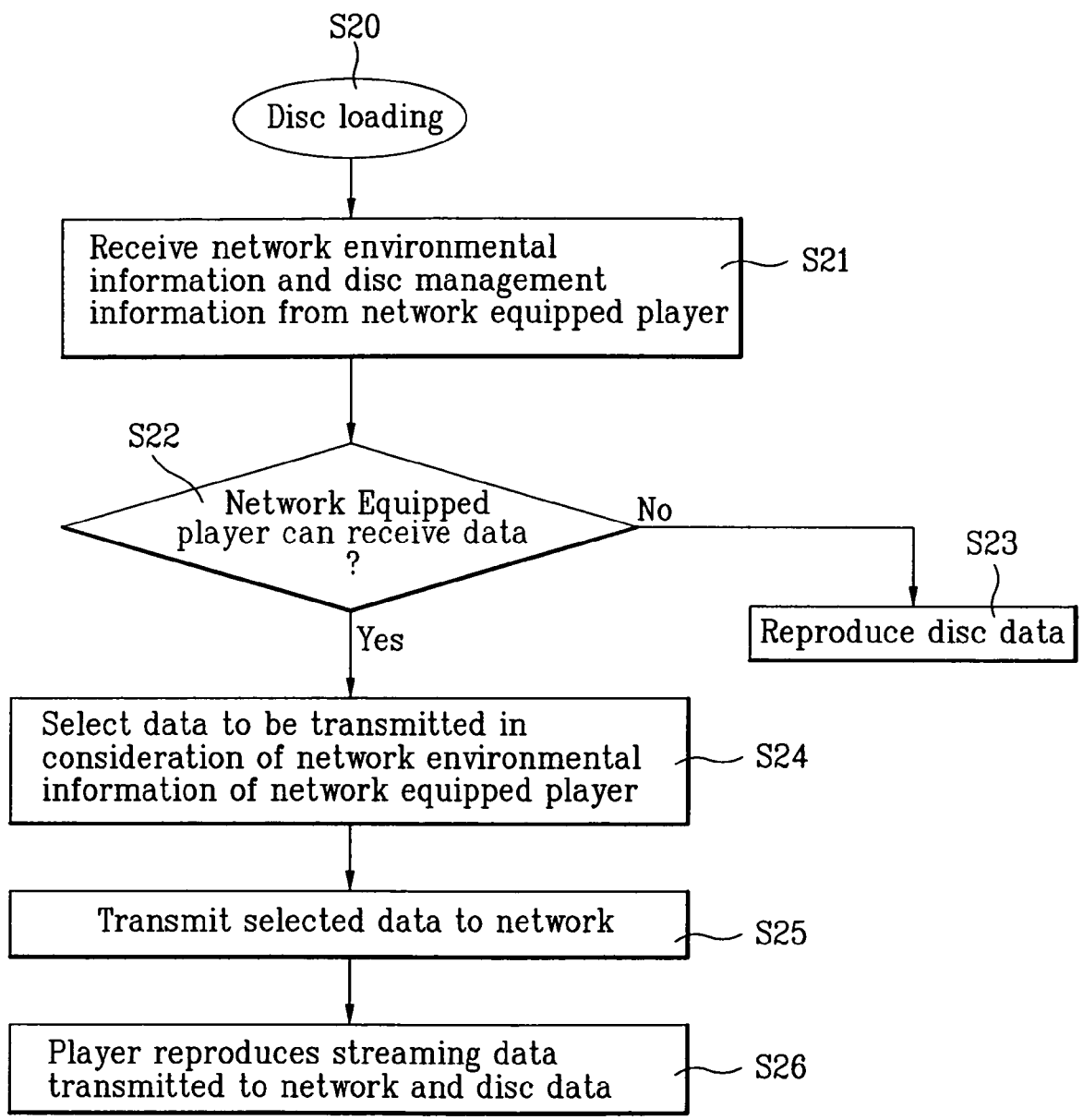

METHOD AND APPARATUS FOR REPRODUCING DATA FROM THE RECORDING MEDIUM

This application claims the benefit of U.S. Provisional Application No. 60/645,037, filed on Jan. 21, 2005, in the name of inventors Sung Wan PARK, entitled "METHOD FOR CONTROLLING HIGH DENSITY OPTICAL DISC", which is hereby incorporated by reference as if fully set forth herein.

This application claims the benefit of Korean Patent Application 10-2005-0033486 filed on Apr. 22, 2005, which is hereby incorporated by reference as if fully set forth herein.

BACKGROUND OF THE INVENTION

1. Field of the Invention

The present invention relates to a method for downloading data associated with a recording medium from an external source, and simultaneously reproducing data recorded in the recording medium and the downloaded data, and more particularly to a method for downloading data in consideration of a network status of an apparatus capable of reproducing the data of the recording medium.

2. Discussion of the Related Art

Generally, there has been widely used an optical disc acting as a recording medium capable of recording a large amount of data therein. Particularly, there has recently been developed a high-density optical recording medium capable of recording/storing high-quality video data and high-quality audio data for a long period of time, for example, a Blu-ray Disc (BD).

The BD based on the next-generation recording medium technique has been considered to be the next-generation optical recording solution capable of storing much more data than a conventional DVD. In recent times, many developers have conducted intensive research into the international standard technical specification associated with the BD along with those of other digital devices.

In association with the above-mentioned situation, there has recently been developed a reproducing device (also called a player) based on the BD international standard, but the BD international standard has not yet been completed, such that many limitations and problems occur in developing the reproducing device.

Particularly, the demand for the above-mentioned reproducing device, which is capable of reproducing data of the recording medium on the condition that it is connected to a network, and reproducing data received over the network simultaneously with reproducing the data of the recording medium, is being rapidly increased.

However, the above-mentioned reproducing device has not yet been developed, such that it is unable to reproduce content provider (CP) data downloaded from an external device over a network simultaneously with reproducing data of the recording medium, such that many limitations and problems occur in developing a BD-based reproducing device employing a network.

SUMMARY OF THE INVENTION

Accordingly, the present invention is directed to a method and apparatus for reproducing data from a recording medium that substantially obviate one or more problems due to limitations and disadvantages of the related art.

An object of the present invention is to provide an apparatus for effectively reproducing data from a recording medium.

Another object of the present invention is to provide an apparatus for effectively reproducing data of a recording medium and downloaded data.

Still another object of the present invention is to provide a reproducing device (i.e., a player) for storing a variety of player status information including network configuration information.

Still another object of the present invention is to provide a method for transmitting data using the network configuration information contained in the reproducing device.

Still another object of the present invention is to provide a method for reproducing data from a recording medium using the player status information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for reproducing data from a recording medium in a player equipped with a network device (i.e., a Network Equipped Player) comprising the steps of: a) if the recording medium is loaded, transmitting network configuration information and identification (ID) information of the loaded recording medium to a content provider (CP); b) downloading data associated with the recording medium from the content provider (CP) over a network; and c) simultaneously reproducing data transmitted over the network and data recorded in the recording medium.

In another aspect of the present invention, there is provided an apparatus for reproducing data from a recording medium in a player equipped with a network device (i.e., a Network Equipped Player) comprising: a playback system which includes a memory unit equipped with network configuration information, and reproduces data downloaded over a network and data recorded in the recording medium; and a controller for transmitting network configuration information and recording-medium ID information to a content provider (CP), downloading data associated with the recording medium from the content provider (CP) over a network, and controlling the playback system to simultaneously reproduce data transmitted over the network and data recorded in the recording medium.

In yet another aspect of the present invention, there is provided a method for transmitting data to a player equipped with a network device (i.e., Network Equipped Player) comprising the steps of: a) receiving network configuration information and recording medium identification (ID) information from the player; b) recognizing the network configuration information of the player, and determining a network status of a corresponding player according to the recognized network configuration information; and c) transmitting data associated with the recording medium to the player according to the network status of the player.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 shows a syntax recorded in a recording medium according to the present invention;

FIGS. 6A~6B are structural diagrams illustrating exemplary PSRs (Player Status Registers) contained in the reproducing device in accordance with a first preferred embodiment of the present invention;

FIG. 8 is a flow chart illustrating a method for allowing a content provider (CP) to transmit data to a reproducing device according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A method and apparatus for reproducing data from the recording medium will hereinafter be described with reference to the annexed drawings.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc., according to various recording schemes.

For the convenience of description and better understanding of the present invention, the optical disc, such as a BD or an HD-DVD, will hereinafter be exemplarily used as the above-mentioned recording medium in the present invention. It should be noted that technical ideas of the present invention can be applied to other recording mediums without departing from the scope and spirit of the invention.

Figure 1:
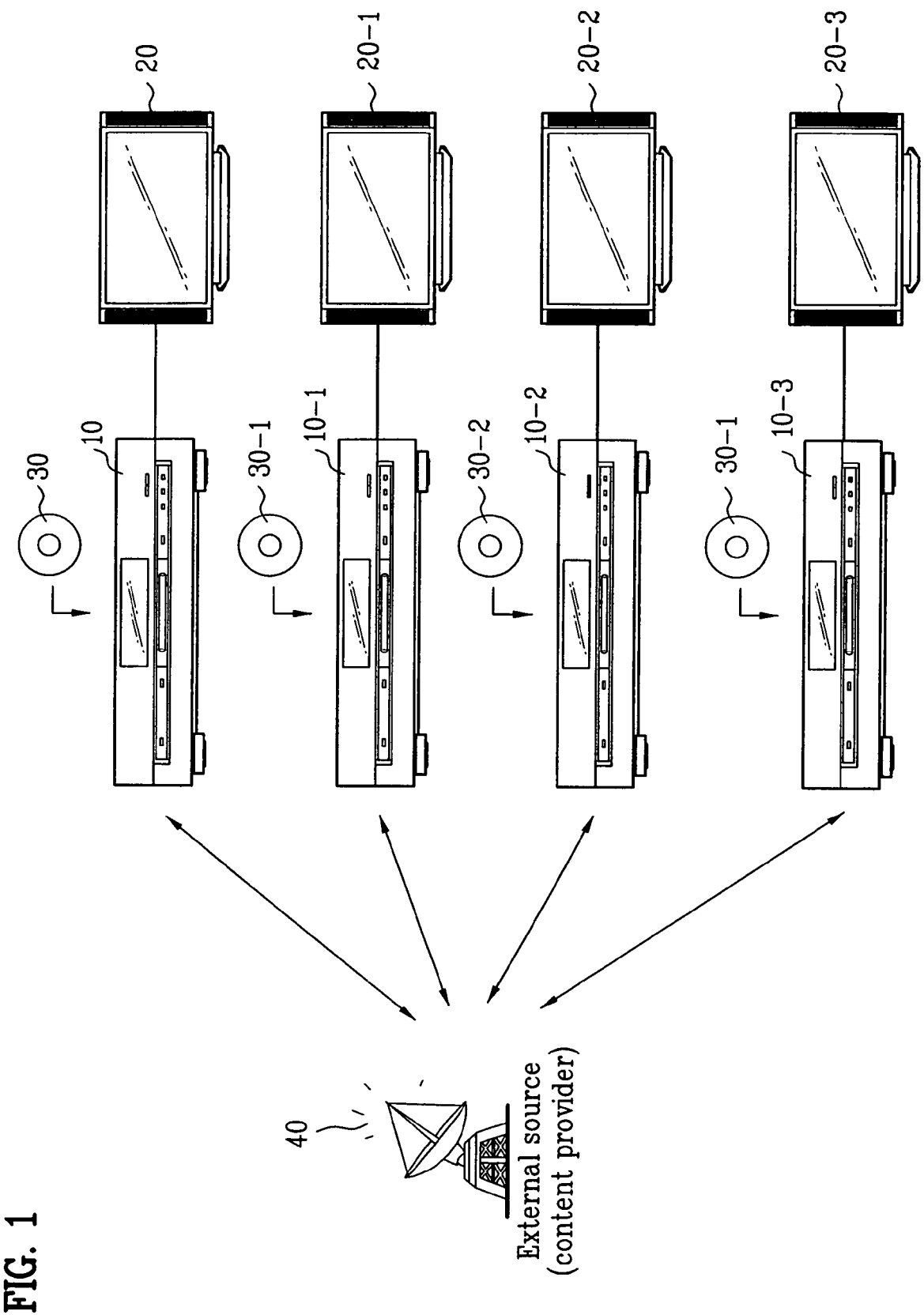
FIG. 1 is a conceptual diagram illustrating a method and apparatus for reproducing data from a recording medium according to the present invention.

FIG. 1 is a conceptual diagram illustrating a method and apparatus for reproducing data from the recording medium according to the present invention. Unified usages of the reproducing device and peripheral devices are shown in FIG. 1.

Referring to FIG. 1, the reproducing devices 10, 10-1, 10-2, and 10-3 can record/reproduce data in/from various optical discs having different formats. If necessary, the reproducing devices 10, 10-1, 10-2, and 10-3 can reproduce specific data from only a specific optical disc such as a BD. It should be noted that the present invention exemplarily uses a player (e.g., a BD-player or a HDDVD-player) capable of reproducing data from a high-density recording medium in consideration of correlation between the high-density recording medium and peripheral devices for the convenience of description. In association with the above-mentioned description, it is well known in the art that the reproducing devices 10, 10-1, 10-2, and 10-3 are also applicable to a drive embedded in a specific device such as a computer.

The reproducing devices 10, 10-1, 10-2, and 10-3 record or reproduce data in/from the optical discs 30, 30-1, 30-2, and 30-3, respectively, receive an external input signal, perform a signal process on the received signal, and transmit the signal processed result to the external displays 20, 20-1, 20-2, and 20-3, such that a user can view the signal processed result on the displays 20, 20-1, 20-2, and 20-3. In this case, there is no limitation in a receivable external signal. For example, representative external input signals may be determined to be a DTV (Digital multimedia broadcasting TV)-associated signal and an Internet-associated signal, etc. Specifically, the Internet is indicative of a communication network to which a user easily gains access, such that the user can download specific Internet data using the reproducing devices 10, 10-1, 10-2, and 10-3, and can use the downloaded data. Also, the Internet allows the user to receive specific data in real time from a desired server, such that the user can use the received data in real time.

In association with the above-mentioned description, a person for providing content data used as an external source is generally referred to as a content provider (CP).

When original data is recorded in the optical discs 30, 30-1, 30-2, and 30-3 seated in the reproducing devices 10, 10-1, 10-2, and 10-3, and additional data associated with the original data is present in other storage places (e.g., Internet), the present invention aims to reproduce the original data and the additional data at the same time.

In more detail, it is assumed that multiplexed AV (Audio/Video) streams are recorded as the original data recorded in the optical disc, and additional data streams associated with the original data are present in the Internet. In this case, some users may desire to download an additional data stream over the Internet, may desire to reproduce the downloaded additional data stream along with the AV stream acting as original data, or may desire to reproduce only the additional data.

For example, provided that a user of the first reproducing device 10 desires to receive a Korean audio stream as additional data over a network, a user of the second reproducing device 10-1 desires to receive a Japanese audio stream as additional data over a network, a user of the third reproducing device 10-2 desires to receive a French audio stream as additional data over a network, a user of the fourth reproducing device 10-3 desires to receive an English audio stream as additional data over a network, the reproducing devices 10, 10-1, 10-2, and 10-3 transmit the demands or commands of the above-mentioned users and network configuration information to the content provider (CP). The content provider (CP) selects data appropriate for the user commands of the above-mentioned reproducing devices 10, 10-2, 10-3, and 10-3, and transmits the selected data.

In association with the above-mentioned description, for the convenience of description, although a signal recorded in the disc is referred to as the original data, and other signals existing outside of the disc are referred to as the additional data, it should be noted that the original data and the additional data classified according to their data acquisition methods are not limited to only specific data. In other words, data associated with the original data simultaneously existing outside of the optical disc may act as additional data.

A relationship between a recording medium and a reproducing device including network equipment will hereinafter be described in detail.

Figures 2A, 2B:
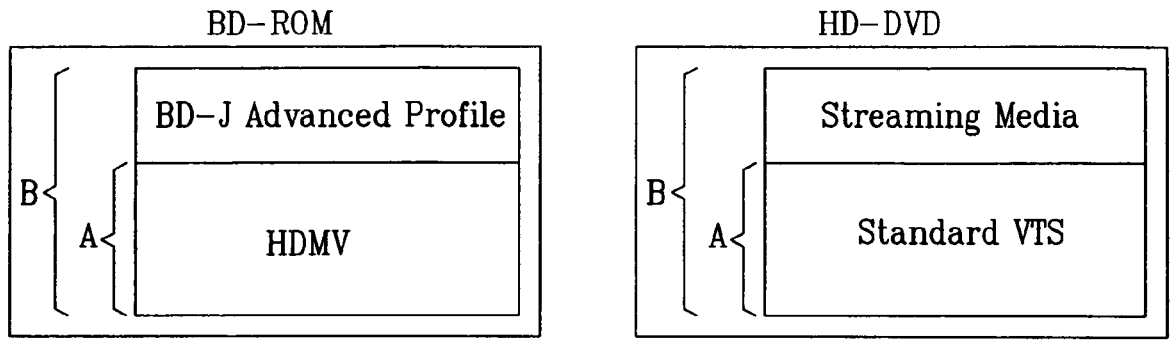
FIGS. 2A~2B are conceptual diagrams illustrating a specific status indicating whether a reproducing device appropriate for category information of a recording medium reproduces data of the recording medium according to the present invention.

FIGS. 2A~2B are conceptual diagrams illustrating a specific status indicating whether a reproducing device appropriate for category information of a recording medium reproduces data of the recording medium according to the present invention.

For example, FIG. 2A shows an exemplary content programming type recorded in a BD-ROM or HD-DVD used as a high-density recording medium for use in network environments.

FIG. 2B shows a specific status indicating whether the reproducing device reproduces individual types of FIG. 2A according to Network Equipped Player (i.e., a player equipped with a network) status or No Network Equipped Player (i.e., a player having no network) status.

Referring to FIG. 2A, the A-type disc is indicative of a recording medium having high-quality video data without having a network function, and the B-type disc is indicative of a recording medium having a program equipped with the network function.

For example, in the case of the BD-ROM (Blu-ray Disc Read Only Format), the A-type disc is indicative of a HDMV-equipped disc which includes only high-density video data without having a network program, and the B-type disc is indicative of a disc which stores not only the HDMV including only the high-density video data but also a program capable of activating a network function. Since the B-type disc includes a network program, the reproducing device can download data from an external part by communicating (or networking) with the external part after the disc has been loaded in the reproducing device.

In association with the above-mentioned description, the Java program is used as the above-mentioned program, and the disc equipped with the Java program is referred to as a disc equipped with a BD-J Advanced Profile (i.e., a BD-J Advanced Profile-Equipped Disc).

For another example, in the case of the HD-DVD (High Definition DVD), the A-type disc is indicative of a standard VTS disc which includes only high-density video data without having a network program, and the B-type disc is indicative of a streaming disc which stores a program equipped with a network function, such that the B-type disc can allow the reproducing device to network with an external device.

Referring to FIG. 2B, status information of a player acting as the reproducing device and specific information indicating whether the player reproduces data according to disc types. In association with the above-mentioned description, the A-type disc of FIG. 2B and the B-type disc of FIG. 2B are equal to those of FIG. 2A.

Data of the A-type disc can be reproduced by both the Network Equipped Player and the No Network Equipped Player. In other words, the A-type disc reproduces only high-density data recorded in the disc without receiving data over a network, such that the player can reproduce data of the A-type disc irrespective of an activation or inactivation status of the network.

In association with the above-mentioned description, in the case of the B-type disc, the No Network Equipped Player can reproduce only the HDMV or the Standard VTS indicative of high-density video data recorded in the B-type disc. In the case of the Network Equipped Player, a reproduction status is changed according to a network access status.

For example, if the network access status is determined to be an unstable access status (i.e., a poor access status), a user may command the reproducing device to reproduce only the high-density video data recorded in the recording medium without reproducing downloaded data received over the network. If the network access status is determined to be a stable access status (i.e., a good access status), a user can command the reproducing device to reproduce not only high-density video data recorded in the recording medium, but also data downloaded from an external content provider (CP).

In order to reproduce data of the recording medium and data downloaded from the external CP, a program capable of transmitting/receiving data over a network must be recorded in the recording medium. A detailed description thereof will hereinafter be described with reference to FIGS. 3A~4.

Figure 3A:
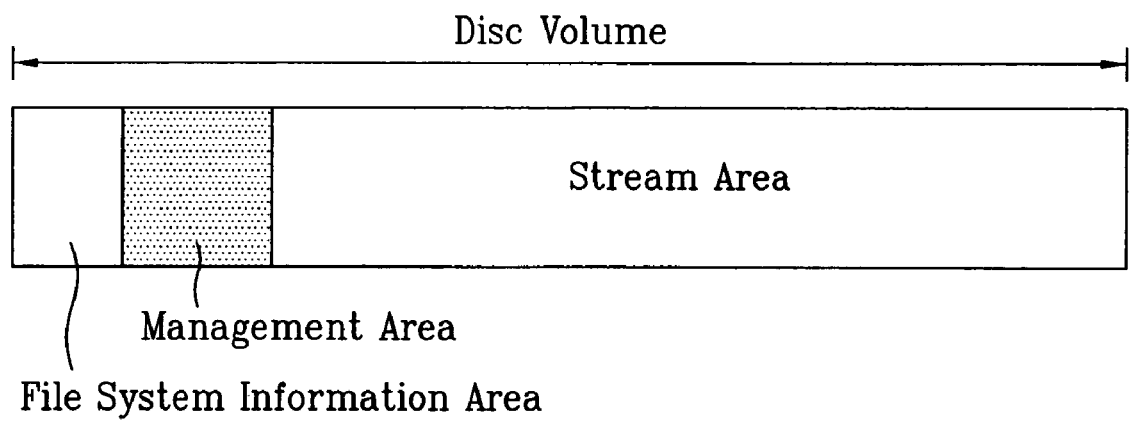
FIGS. 3A~3B are structural diagrams illustrating exemplary recording medium structures according to the present invention.
Figure 3B:
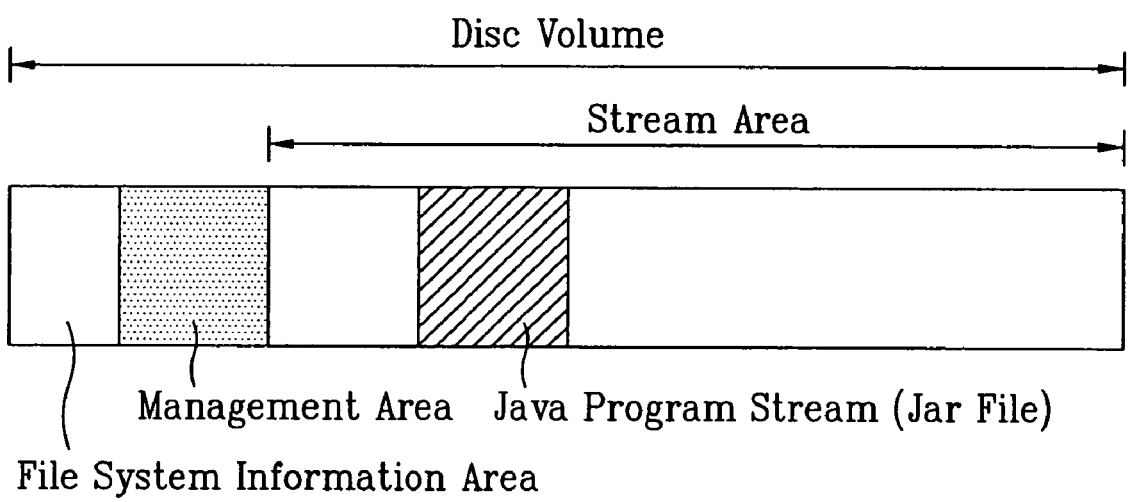

FIGS. 3A~3B show exemplary disc structure in which network-associated information is recorded according to the present invention.

Referring to FIG. 3A, from the viewpoint of an inner area of the disc, the above-mentioned disc structure sequentially includes a file system information area used as system information capable of managing all files; a management area for storing disc management information; and a stream file area (also called a stream area) for storing audio data, video data, and graphic data, etc.

FIG. 3A shows an example in which a networking program is recorded in the management area. FIG. 3B shows an example in which the networking program is recorded in the stream area. For example, the above-mentioned program is a Java program, and the Java program is recorded in the disc in the form of a Java program stream. For example, the Java program is recorded in the form of a "*.jar" file.

FIG. 4 shows an exemplary syntax of a Java program stream recorded in the recording medium. Referring to FIG. 4, the "If (Network Equipped Player)" area of the syntax and the "If (Network Connection==OK)" area of the syntax are indicative of parameters for recognizing a network status.

In other words, the "If (Network Equipped Player)" area is indicative of a parameter capable of recognizing the Network Equipped Player which can receive data from an external source simultaneously with transmitting data to the external source. The "If (Network Connection==OK)" area is indicative of a parameter for recognizing a network connection status indicating whether the reproducing device has no program in receiving data from the external source. Also, the "If (Network Connection==OK)" area can also be used as a parameter for recognizing a network transmission/reception speed.

The "check the network line" area of the syntax is indicative of a parameter by which a user confirm command is received from a user interface, such that the parameter enables the next process to be executed. The "do streaming and play" area of the syntax is indicative of a parameter indicating whether accommodation is executed according to stream media types. In more detail, the "do streaming and play" area is used as a parameter for either a storage size required for the device when the disc must be pre-loaded or playability information for each codec.

Particularly, the reproducing device according to the present invention can include a local storage as a fixed storage, and can use a removable storage as a mobile storage. Representative examples of the above-mentioned removable storage are a Universal Serial Bus (USB) storage and a memory stick, etc.

Figure 5:
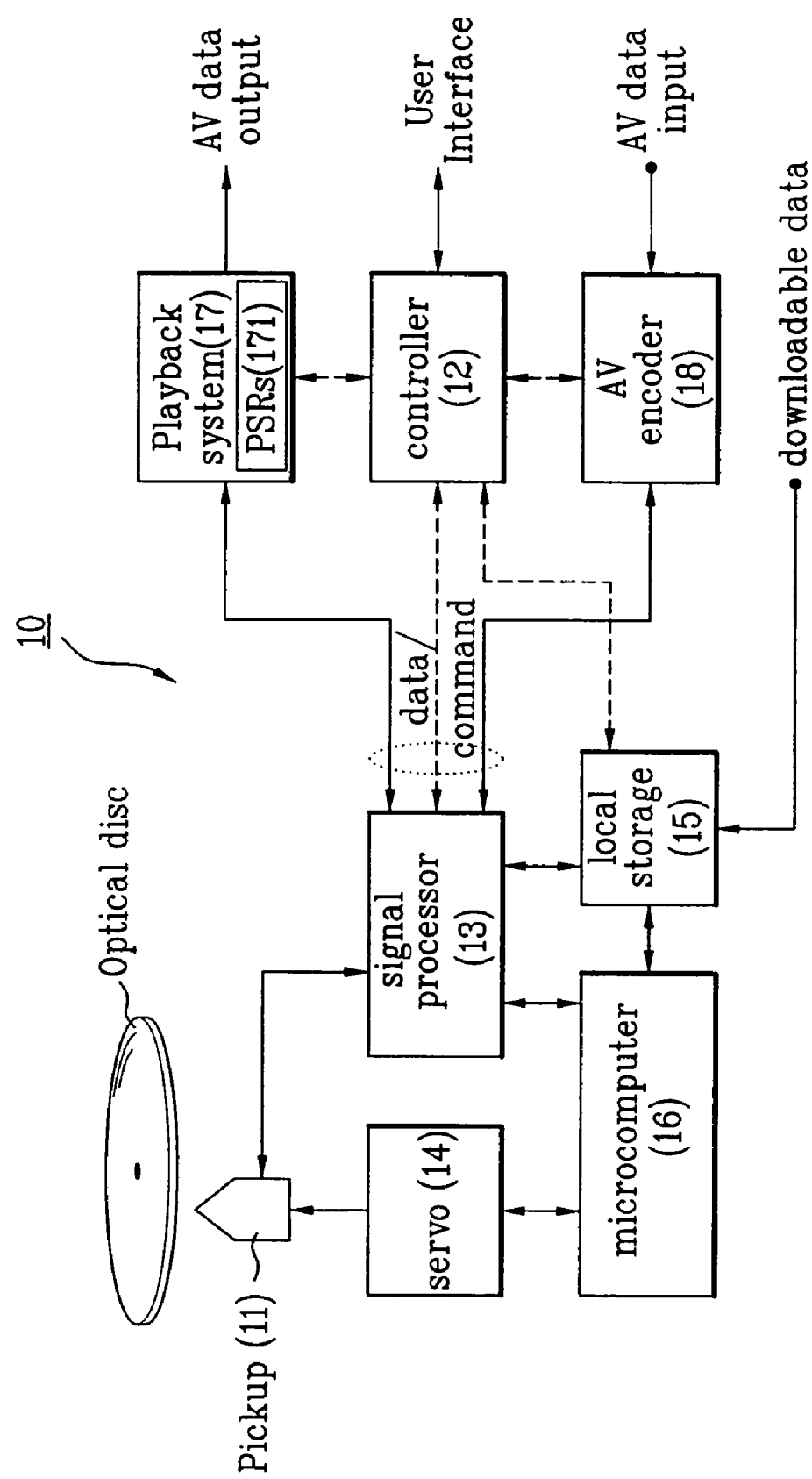
FIG. 5 is a block diagram illustrating a reproducing device (i.e., a player) according to the present invention.

The reproducing device (shown in FIGS. 3~4) for loading the disc will hereinafter be described. FIG. 5

FIG. 5 is a block diagram illustrating a reproducing device (i.e., a player) according to the present invention.

Referring to FIG. 5, the reproducing device 10 according to the present invention includes a pickup unit 11, a servo unit 14, a signal processor 13, and a microcomputer (also called a microcomputer) 16. The pickup unit 11 reads data recorded in the optical disc and management information including reproduction/management file information. The servo unit 14 controls operations of the pickup unit 11. The signal processor 13 receives a reproduction signal from the pickup unit 11, restores the received reproduction signal to a desired signal value, or modulates a signal to be recorded into another signal recorded in the optical disc, such that it transmits the restored or modulated result. The microcomputer 16 controls overall operations of the pickup unit 11, the servo unit 14, and the signal processor 13. In association with the above-mentioned description, it is well known in the art that the reproduction device 10 equipped with the pickup unit 11, the servo unit 13, the signal processor 13, and the microcomputer 16 is referred to as a recording/reproducing unit or a drive.

The reproducing device includes the local storage 15, downloads data from a content provider (CP) acting as an external source, and stores the downloaded data in the local storage 15, such that the downloaded data and data of the optical disc can be reproduced at the same time. As described above, the removable storage can also be used as the local storage.

The playback system 17 is used as a playback unit for simultaneously reproducing disc data and local storage data, downloads data from an external source over a network, and stores the downloaded data in the local storage 15. Therefore, the playback system 17 reproduces the disc data and the local storage data upon receiving a request from the user.

In association with the above-mentioned description, the playback system 17 includes at least one PSR (Player Status Register) 171 acting as a memory unit for storing a variety of network configuration information. The information stored in the PSR will be described with reference to drawings from FIG. 6A.

The AV encoder 18 converts an input signal into a specific format signal (e.g., an MPEG2 transport stream) upon receiving a control signal from the controller 12, and transmits the converted result to the signal processor 13, such that it can record a desired signal in the optical disc.

The controller 12 controls all operations of the reproducing device 10. Specifically, the controller 12 receives a user command by communicating with the user, and controls operations of the above-mentioned constituent components using the user command.

An apparatus and method for reproducing stream data received over a network will hereinafter be described with reference to FIGS. 6A~8.

FIGS. 6A~8D show a variety of preferred embodiments associated with various information stored in a plurality of PSRs (Player Status Registers) of the playback system 17.

FIGS. 6A~6B are structural diagrams illustrating exemplary PSRs (Player Status Registers) contained in the reproducing device in accordance with a first preferred embodiment of the present invention. FIG. 6A shows category information of the PSRs used when data of the optical disc is reproduced by the reproducing device 10. In other words, the reproducing device 10 reproduces data of the optical disc by referring to values prescribed in individual PSRs contained in the playback system 17.

Specifically, the PSRs are classified into two kinds of PSRs (i.e., Playback Status Registers and Player Setting Registers). The Playback Status Registers correspond to registers from PSR0 to PSR12, which can store playback status parameters. The Player Setting Registers correspond to registers from PSR13 to PSR18 and registers from PSR30 to PSR31, and store player configuration parameters. Each PSR is composed of 32 bits.

In association with the above-mentioned description, the above-mentioned playback status registers (PSR0~PSR12) are composed of various information indicative of status information of a currently-reproduced optical disc. For example, the PSR0 records an Interactive Graphics Stream Number, the PSR1 records an audio stream number, the PSR2 records a presentation graphic stream number or a text subtitle stream number, the PSR3 records an angle number, the PSR4 records a title number, the PSR5 records a chapter number, the PSR6 records a playlist ID, the PSR7 records a playitem ID, the PSR8~PSR9 record presentation time information and navigation timer information, the PSR10 records selected button information (i.e., Button ID in Selected State), the PSR11 records a menu page ID, and the PSR12 records a user style ID of a reproduced text subtitle stream.

Specifically, the above-mentioned Playback Status Registers (PSR0~PSR12) are determined to be predetermined initial values at an initialization step. Thereafter, the predetermined values are changed according to a user-selected playback stream and a user-selected playback method.

The above-mentioned Playback Status Registers (PSR13~PSR18 and PSR30~PSR31) are composed of information indicative of a playback status of the reproducing device. For example, the PSR13 records Parental level information capable of prohibiting minors from viewing an inappropriate program. The PSR15 records "Player Configuration for Audio" information associated with a playable audio format (e.g., LPCM, AC-3, and DTS decoding available or unavailable status). The PSR16~PSR18 record audio language information, text subtitle language information, and menu language information, respectively. The PSR30 records "Player Capability for Text Subtitle" information indicating whether the text subtitle stream can be reproduced. The PSR31 records "Player Version" information indicative of a playback version of the reproducing device.

In association with the above-mentioned description, 16 bits (b0~b15) from among 32 bits of the PSR31 are used as player version information, and the remaining 16 bits (b16~b31) are used as a reserved area. In this case, if 16 bits (b0~b15) used as the player version are denoted by "0000000000000000b", the player is determined to be a HDMV player capable of reproducing high-density video data recorded in the disc.

FIG. 6B shows the PSR32 (Network Configuration and Streaming Media Playability) composed of 32 bits from among all PSRs shown in FIG. 6A.

Specifically, the bit (b0) from among the 32 bits of the PSR32 is adapted to indicate whether the reproducing device accommodates a BD-J profile recorded as a Java program in the recording medium. For example, if the b0 bit is set to "1", the b0 bit of 1 indicates that the BD-J profile can be accommodated in the reproducing device. If the b0 bit is set to "0", the b0 bit of 0 indicates that the BD-J profile cannot be accommodated in the reproducing device.

The bit (b1) from among the 32 bits of the PSR32 is adapted to determine whether a current player is a Network Equipped Player. For example, if the b1 bit is set to "1", the b1 bit of 1 indicates a networking available state. If the b1 bit is set to "0", the b1 bit of 0 indicates a networking unavailable state.

The bit (b2) from among the 32 bits of the PSR32 is adapted to indicate a network connection status. For example, if the b2 bit is set to "1", the b2 bit of 1 indicates stable network connection status. If the b2 bit is set to "0", the b1 bit of 0 indicates an unstable network connection status.

In the case of the 16 bits (b16~b31) for indicating the presence or absence of the streaming media playability, if only one bit b16 has the value of 1 and the remaining bits have the value of zero, this means the presence of the streaming media playability. If all corresponding bits b16~b31 are denoted by "0000000000000000b", this means the absence of the streaming media playability. However, it is obvious to those skilled in the art that a corresponding bit stream can be defined in various ways to determine the presence or absence of the streaming media playability. In this case, the remaining unused bits b3~b15 are used as a reserved area.

In accordance with another preferred embodiment of the above-mentioned PSR, the above-mentioned all information can also be contained in the PSR31. For example, the bit (b0) from among 31 bits of the PSR31 is used as information for determining whether the reproducing device accommodates the BD-J profile. The bit (b1) is used as information for determining whether the reproducing device is the Network Equipped Player. The bit (b2) is used as information for determining a network connection status. The bits b3~b15 are used as information for indicating the player version. The bits b16~b31 are used as information for determining the presence or absence of the streaming media playability. In this case, there is no need to allocate an additional PSR32.

In accordance with still another preferred embodiment of the above-mentioned PSR, an additional PSR (not shown) is allocated such that a variety of information can be stored in the PSR. For example, the PSR33 can store storage size information for storing downloaded data. As described above, the storage may be a local storage or a removable storage. For example, the PSR34 may store specific information indicative of "Player Capability for Streaming Media" information.

The above-mentioned preferred embodiments associated with the PSRs 171 of the playback system 17 exemplarily use the PSRs used for the BD-ROM from among a variety of discs. Therefore, the application of the above-mentioned PSRs is equally applied to the HD-DVD. In this case, the above-mentioned PSRs are defined as an SPRM in the HD-DVD.

Figure 7:
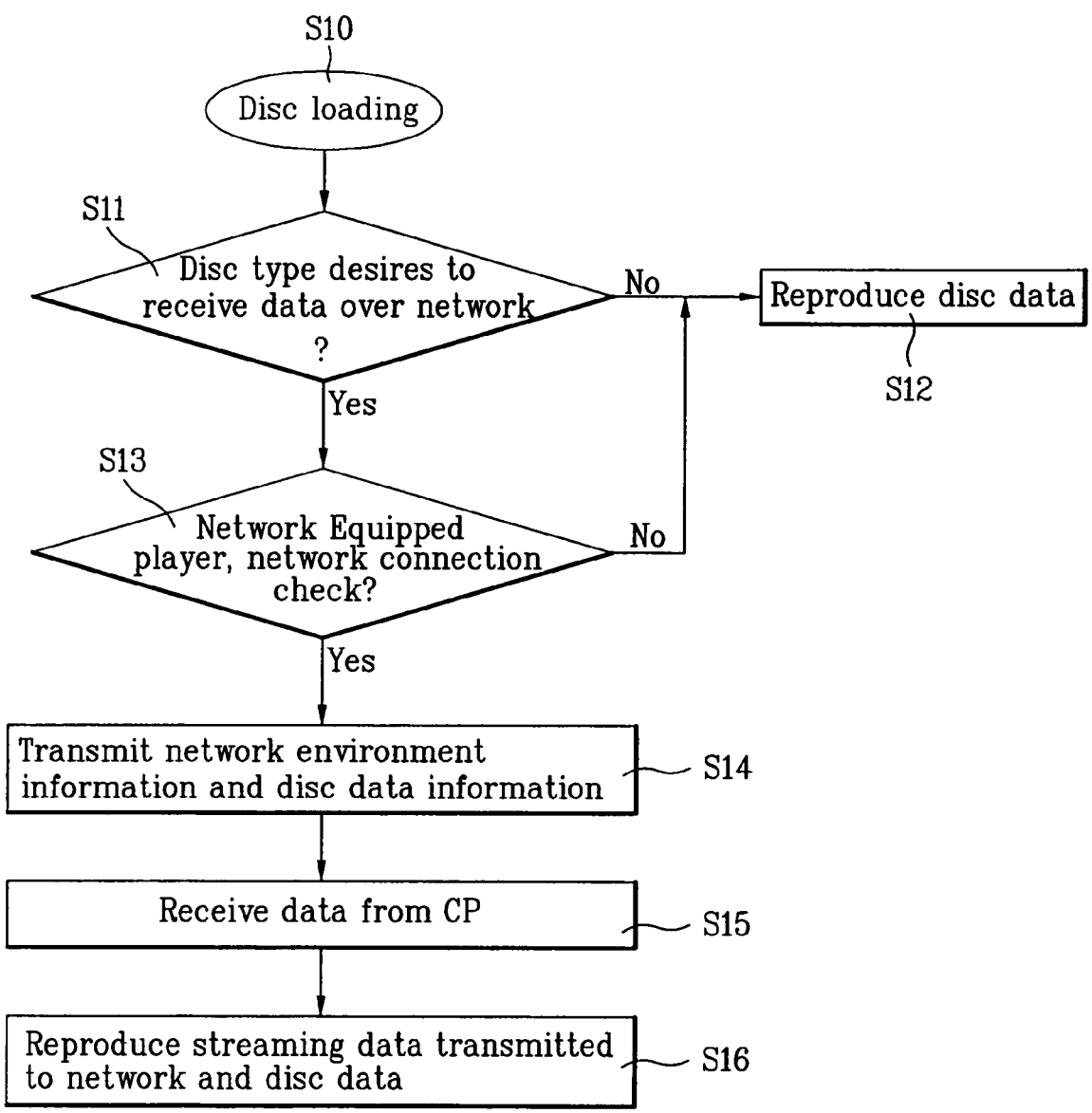
FIG. 7 is a flow chart illustrating a method for reproducing data of a recording medium and data received over a network according to the present invention.

FIG. 7 is a flow chart illustrating a method for reproducing data of a recording medium and streaming data received over a network according to the present invention. Referring to FIG. 7, a disc acting as a recording medium is loaded in the reproducing device at step S10. It is determined whether data of the disc loaded in the reproducing device can be reproduced along with data downloaded over a network at step S11. For example, it is determined whether a current disc is the B-type disc shown in FIG. 2A at step S11. In this case, the B-type disc is determined to be one of a BD-ROM disc for storing a Java program and an HD-DVD disc for storing streaming media data.

If it is determined that the disc type indicates that data received over a network is not required at step S11, for example, if the disc type is determined to be the A-type disc of FIG. 2A, the reproducing device reproduces only data recorded in the disc at step S12. If it is determined the disc type indicates that data receiver over the network is required at step S11, the reproducing device determines whether a network device is the Network Equipped Player, and determines a network connection status at step S13.

If the reproducing device is not determined to be the Network Equipped Player at step S13, it can reproduce only data of the disc at step S12. Also, although the reproducing device is determined to be the Network Equipped Player at step S13, it can reproduce only data of the disc at step S12 on the condition that it is connected to a network. However, although the network connection status is unstable at step S13, the reproducing device equal to the Network Equipped Player can selectively receive data over the network according to a user selection command.

If the reproducing device is determined to be the Network Equipped Player, it is connected to a network, and a network connection status is stable at step S13, the reproducing device transmits not only a user request but also network configuration information of the reproducing device and identification (ID) information of the disc to the content provider (CP) at step S14.

The network configuration information at step S14 is indicative of information stored in the above-mentioned PSR, and includes information indicative of the presence or absence of the Network Equipped Player, information indicative of a network connection status, and streaming media playability information, etc. The disc ID information indicates category information of a corresponding disc. For example, based on the disc ID information, a user can recognize what content provider (CP) has manufactured titles of a corresponding disc, and can also recognize what title is contained in the corresponding disc. Also, security information must be provided to the content provider to protect content data.

Thereafter, the reproducing device receives data transmitted from the content provider (CP) at step S15. In this case, the content provider (CP) transmits additional data associated with original data recorded in a corresponding disc in consideration of the network configuration information, the disc ID information, and the security information, etc., and transmits the above-mentioned additional data according to data attribute information (e.g., Tx speed and Rx speed) appropriate for network environments of a corresponding reproducing device.

The additional data received in the reproducing device after being transmitted over the network is temporarily stored in the local storage of the reproducing device, and the stored additional data is reproduced at step S16, or the additional data is reproduced in real time at step S16. However, it should be noted that the additional data can be reproduced along with original data recorded in the disc, or can be selectively reproduced.

FIG. 8 is a flow chart illustrating a method for allowing a content provider (CP) to transmit data to the reproducing device according to the present invention.

Referring to FIG. 8, a disc acting as a recording medium is loaded in the reproducing device at step S20. After the disc is loaded in the reproducing device at step S20, the content provider (CP) receives network configuration information and disc ID information from the reproducing device equal to the Network Equipped Player at step S21.

After receiving the network configuration information and the disc ID information at step S21, it is determined whether the reproducing device equal to the Network Equipped Player can receive data over a network at step S22. If it is determined that the reproducing device cannot receive data over the network at step S22, the content provider (CP) does not transmit data to the network, and the reproducing device reproduces only data recorded in the disc at step S23. If it is determined that the reproducing device can receive data over the network at step S22, the content provider (CP) selects data to be transmitted in consideration of the disc ID information, network configuration information of the reproducing device, and user-desired data information to be downloaded at step S24.

In association with the above-mentioned description, the number of the reproducing devices connected to the content provider (CP) over a network capable of transmitting/receiving data to/from the content provider (CP) is at least one, and the number of the reproducing devices is changed according to network status information or user selection information. If data to be transmitted is selected at step S24, the selected data is transmitted to individual reproducing devices over the network at step S25. The reproducing devices having received the above-mentioned data reproduces transmitted streaming data and data recorded in the disc at the same time, or selectively reproduces the transmitted streaming data and the data recorded in the disc at step S26.

As apparent from the above description, a recording medium, and a method and apparatus for reproducing data from the recording medium according to the present invention can reproduce not only data of the recording medium but also external data received over a network.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for reproducing data from a recording medium using a player equipped with a network device, the method comprising:
    loading the recording medium on the player;
    determining whether a the recording medium is reproducible along with data downloaded over a network;
    reading player status registers contained in the player, the player status registers including,
        Java profile information of the player, the Java profile information indicating whether the player accommodates a Java profile recorded on the recording medium, and
        network configuration information of the player, the network configuration information including a first network information field indicating whether the player is a network equipped player and a second network information field indicating a network connection status of the player;
    transmitting the network configuration information and identification (ID) information of the recording medium to a content provider (CP);
    downloading data associated with the recording medium from the content provider (CP) over a network; and
    reproducing data transmitted over the network and data recorded in the recording medium,
    wherein the data downloaded over the network includes attribute information defined by network configuration information of the player.

2. The method of claim 1, wherein the determining whether the recording medium is reproducible along with data downloaded over a network includes determining whether the recording medium includes a Java program.

3. An apparatus for reproducing data from a recording medium, the apparatus comprising:
    a playback system configured to reproduce data downloaded over a network and data recorded in the recording medium, the playback system including player status registers, the player status registers including,
        Java profile information of the apparatus, the Java profile information indicating whether the player accommodates a Java profile recorded on the recording medium, and
        network configuration information of the apparatus, the network configuration information including a first network information field indicating whether the player is a network equipped player and a second network information indicating a network connection status of the player; and
    a controller configured to,
        determine whether the recording medium is reproducible along with data downloaded over a network,
        read the network configuration information of the player;
        transmit the network configuration information and ID information of the recording-medium to a content provider (CP),
        download data associated with the recording medium from the content provider (CP) over a network, and
        control the playback system to reproduce data transmitted over the network and data recorded in the recording medium,
    wherein the data downloaded over the network includes attribute information defined by network configuration information of the player.

4. The apparatus of claim 3, wherein the player status registers include version information of the apparatus.

5. The apparatus of claim 3, wherein the player status registers include storage size information of the apparatus.

6. The apparatus of claim 5, wherein the playback system includes a local storage.

7. The apparatus of claim 6, wherein the player registers include data transmission speed information of the local storage.

8. The apparatus of claim 6, wherein the local storage is a removable storage.

9. The apparatus of claim 8, wherein the player status registers include data transmission speed information of the removable storage.

10. The apparatus of claim 3, wherein the player status registers include data transmission speed information of the apparatus.

* * * * *